(12) United States Patent
Thornton et al.

(10) Patent No.: US 7,779,275 B2
(45) Date of Patent: Aug. 17, 2010

(54) COMMUNICATION OF INFORMATION VIA AN IN-BAND CHANNEL USING A TRUSTED CONFIGURATION SPACE

(75) Inventors: Andrew J. Thornton, Seattle, WA (US); John E. Paff, Redmond, WA (US); John F. Wiederhirn, Redmond, WA (US); Lonny Dean McMichael, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1302 days.

(21) Appl. No.: 11/285,882

(22) Filed: Nov. 23, 2005

(65) Prior Publication Data

US 2007/0118743 A1 May 24, 2007

(51) Int. Cl.
*G06F 12/14* (2006.01)
(52) U.S. Cl. .................................... 713/194; 713/190
(58) Field of Classification Search .............. 713/1, 713/2, 188, 194, 190; 380/200, 201, 255, 380/277; 726/2
See application file for complete search history.

(56) References Cited

U.S. PATENT DOCUMENTS

| | | | |
|---|---|---|---|
| 5,978,903 A * | 11/1999 | Quimby et al. | 712/229 |
| 6,654,346 B1 * | 11/2003 | Mahalingaiah et al. | 370/235 |
| 6,704,871 B1 * | 3/2004 | Kaplan et al. | 713/192 |
| 6,708,273 B1 * | 3/2004 | Ober et al. | 713/189 |
| 7,149,862 B2 * | 12/2006 | Tune et al. | 711/163 |
| 7,228,400 B2 * | 6/2007 | Sheriff et al. | 711/203 |
| 7,246,213 B2 * | 7/2007 | Gardner | 711/163 |
| 7,334,123 B2 * | 2/2008 | Gulick et al. | 713/160 |
| 7,552,282 B1 * | 6/2009 | Bermingham et al. | 711/119 |
| 2003/0233524 A1 * | 12/2003 | Poisner | 711/156 |
| 2005/0256991 A1 * | 11/2005 | Keller | 710/309 |
| 2006/0004944 A1 * | 1/2006 | Vij et al. | 711/6 |
| 2006/0050693 A1 * | 3/2006 | Bury et al. | 370/389 |
| 2006/0126612 A1 * | 6/2006 | Sandy et al. | 370/389 |

* cited by examiner

*Primary Examiner*—Kimyen Vu
*Assistant Examiner*—Edward Zee
(74) *Attorney, Agent, or Firm*—Woodcock Washburn LLP

(57) ABSTRACT

Communication of information via an in-band channel using a trusted configuration space is provided. The introduction of using a trusted configuration space associated with a computer bus system, such as PCI Express® (PCIe™), for example, enables the design of trusted computing platforms capable of providing compliant devices with assurance that their trusted configuration registers can only be accessed by software running in the trusted software environment. Establishing device trust in the software that initiates trusted configuration requests makes it possible to secure and control access to certain secret, sensitive, or personally-identifiable information these devices may contain (e.g., a uniquely-identifying public key, as described above or certificate which the device provides for revocation purposes).

17 Claims, 8 Drawing Sheets

| New TLP | Packet format same as existing TLP | Fmt | Type |
|---|---|---|---|
| TrustCfgRd0 | CfgRd0 | 00 | 0 0110 |
| TrustCfgWr0 | CfgWr0 | 10 | 0 0110 |
| TrustCfgRd1 | CfgRd1 | 00 | 0 0111 |
| TrustCfgWr1 | CgfWr1 | 10 | 0 0111 |
| TrustCpl | Cpl | 00 | 0 1100 |
| TrustCplD | CplD | 10 | 0 1101 |

COMMUNICATION OF INFORMATION VIA AN IN-BAND CHANNEL USING A TRUSTED CONFIGURATION SPACE

BACKGROUND

Components within a computer system are typically connected to each other using a bus. A first component communicates data to a second component by writing data to the bus. A second component then receives the data by reading the bus. More than two components may be connected to a bus so conventions exist that allow a given component to determine whether the data on the bus is destined for that component or for a different component. However, the architecture of many such busses is such that any component can connect to the bus, and can request and receive data off the bus—even if the data is not intended for that component. Thus, the bus provides an opportunity for spoofing devices and/or snooping or modifying data, so typical busses may not be appropriate for transmitting private data in the clear.

One context in which it may be undesirable to place data on a typical bus is where the data could identify the user based on a unique hardware identifier. For reasons of privacy, many users are wary of unique hardware identifiers, and resist using hardware that employs such identifiers. However, some hardware components employ unique public/private key pairs in order to engage in encrypted communication. While identifying the user is not the primary purpose of the key pair, the public key is, in fact, substantially unique to the hardware and could be used for such an identifying purpose. Since the public key must be transmitted to the entity that will use the key to encrypt information, the typical transmission of the key over a bus provides an opportunity for this potentially identifying information to be divulged. Thus, there is a probability that unauthorized (by the machine's owner/user) software could initiate requests for such unique IDs, then use the IDs in malicious ways to correlate/profile user activity on the internet, etc.

In view of the foregoing, there is a need for a system that overcomes the drawbacks of the prior art.

SUMMARY

The present invention provides for communication of information via an in-band channel using a trusted configuration space. In one example, the communication of information via an in-band channel using a trusted configuration space occurs between a first component (such as a trusted software application, for example) and a second component (such as a trusted device, for example). The first component and second component are communicatively connected to each other through a bus that is accessible to components other than the first component and the second component. A communication connection is established between the first component and the second component wherein the communication connection transmits information through the bus. A datum is transmitted between the first component and the second component using a protected address space (i.e., a trusted configuration space) associated with the bus such that using the protected address space only allows the first component under special conditions to communicate with the second component.

The protected address space is protected via an access restriction mechanism that only allows access to the protected address space through read or write requests from the first component and second component if the first and second components are identified as trusted components.

Transmitting the datum between the first component and the second component using a protected address space involves communication via protected address space transaction layer packets that are differentiable from transaction layer packets of the non-protected address space. The relationship between the first and second component may, for example, be a requester/fulfiller relationship. There is discussion in the specification of establishing/ensuring exclusive access to the trusted configuration space (TCS) mechanisms for the requester, i.e., software running in a trusted software environment (TSE). However, what it means to be a "trusted fulfiller" (i.e., trusted device), could be that that the device must provide a TCS and handle the requisite requests or the meaning of "trusted" could, in a more traditional sense, include use of an authenticated identity mechanism as a way of establishing identity of the device in a trustworthy fashion.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustration, there is shown in the drawings example constructions; however, the invention is not limited to the specific methods and instrumentalities disclosed. In the drawings.

DETAILED DESCRIPTION OF THE INVENTION

Exemplary Computing Arrangement

Figure 1:
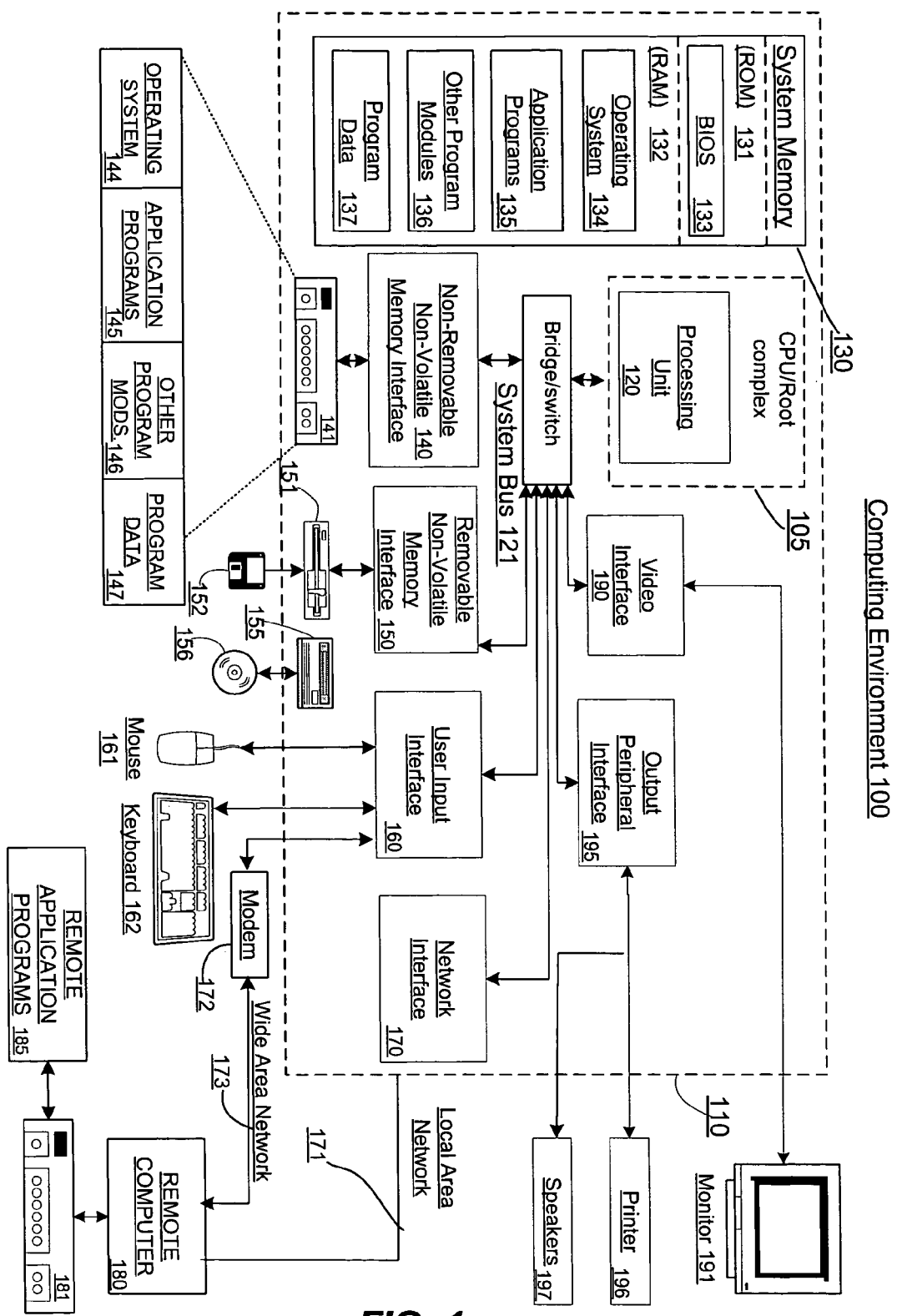
FIG. 1 is a block diagram of an example computing environment in which aspects of the invention may be implemented.

FIG. 1 shows an exemplary computing environment in which aspects of communication of information via an in-band channel using a trusted configuration space may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, game consoles, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include the PCI Express®® (PCIe™) bus. The system bus 121 may be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Communication Between Components in a Computer System

Figure 2:
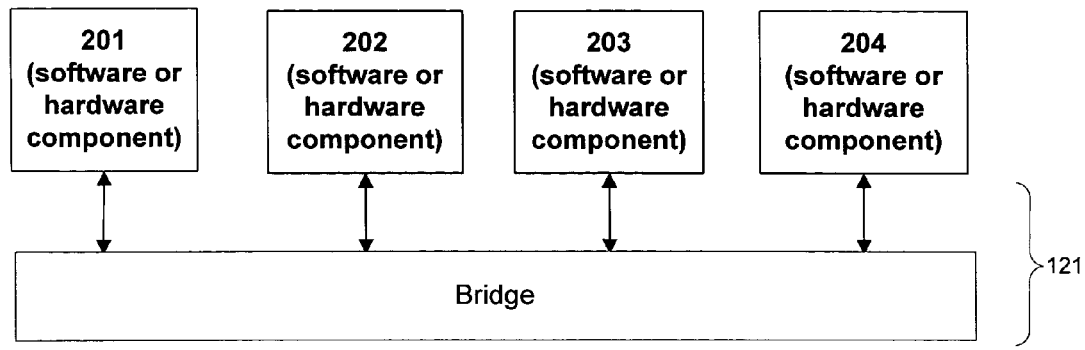
FIG. 2 is a block diagram showing a plurality of components that communicate by way of a bus.

As discussed above in connection with FIG. 1, a computer 110 typically contains a system bus 121, through which different components of computer 110 communicate. Each device or component is often connected to a central "root complex" 105 via a point to point link. In general, when data is to be sent from one component to another, the data is written to bus 121 by the sending component, and read from bus 121 by the receiving component. FIG. 2 shows an example of components 201, 202, 203, and 204, which are connected to bus 121, and may communicate with each other by way of bus 121. For example, component 201 may send data to component 204 by writing the data to bus 121. The data may then be read from the bus by component 204. These components 201, 202, 203, and 204 may be software as well as hardware devices.

In order for components to engage in private communication, they may establish a communication of information via an in-band channel using a trusted configuration space. Specific techniques for establishing communication of information via an in-band channel using a trusted configuration space are discussed below in connection with FIGS. 4-11.

Example Scenario

Figure 3:
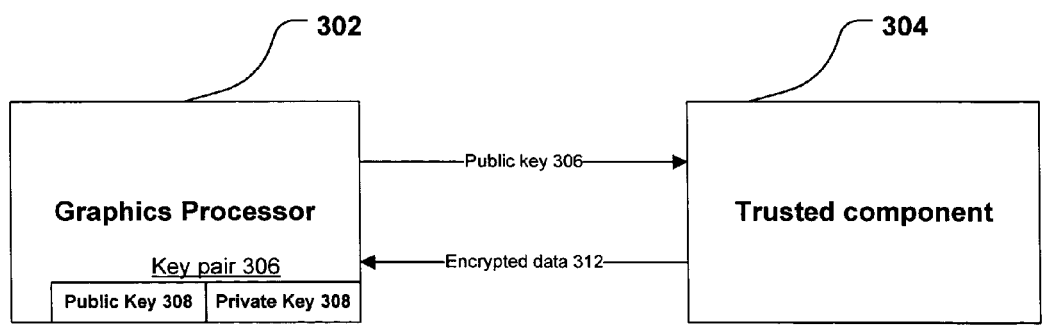
FIG. 3 is a block diagram showing communication of encrypted information between a trusted component and a graphics processor.

FIG. 3 shows an example scenario where it may be desirable to communicate information via an in-band channel using a trusted configuration space. In the example of FIG. 3, trusted component 304 generates data to be communicated to graphics processor 302. The data to be communicated is typically video data to be displayed on a graphics surface (e.g., a monitor), and the nature of the information is such that arbitrary components should not be able to intercept the information. For example, trusted component may be software that handles confidential banking information, and the information being sent to graphics processor 302 may be representative of bank balances, account numbers, etc. As another example, trusted component 304 may be a rendering application that handles copyrighted video, and it may be desirable to ensure that the copyrighted video images destined for the screen cannot be intercepted by entities that might engage in unauthorized distribution of these images. There are various embodiments of trusted component 304, and the invention is not limited to any particular embodiment.

In order to ensure that information sent from trusted component 304 to graphics processor 302 cannot be intercepted, trusted component 304 encrypts the information prior to sending it. The encrypted information is then decrypted at graphics processor 302. In the example of FIG. 3, graphics processor 302 is physically associated with a public/private key pair 306. Public/private key pair 306 comprises a public key 308 and a private key 310. As is known in the art, a variety of algorithms exist that enable information to be encrypted with public key 308 such that the encrypted information is only decryptable with private key 310. In order to allow trusted component 304 to encrypt information destined for graphics processor 302, graphics processor 302 provides trusted component 304 with public key 308. Trusted component 304 is then able to send graphics processor 302 encrypted data 312.

It will be appreciated that, if every graphics processor 302 had the same key pair 306, then information encrypted with public key 308 would be vulnerable to a variety of attacks. In particular, if someone were to discover private key 310, then this key could be made widely available and no instance of graphics processor 310 would ever be able to rely on key pair 306 for secure communication. Thus, part of the security model for graphics processor 302 is that each instance of graphics processor 302 has its own key pair 306. However, since this fact implies that each user's hardware can be identified by a particular number (i.e., the public key 308 stored in that user's instance of graphics processor 302), many users feel this number constitutes an "electronic fingerprint" for the user himself and, for privacy reasons, are wary of allowing such a number to be divulged. As discussed above in connection with FIG. 2, information written to a bus can be intercepted by unintended parties, and thus it is desirable to communicate the public key by some mechanism that provides for the trustful location, identification and configuration of installed devices such as those like the graphics processor 302 of FIG. 3. One such mechanism is communication of information via an in-band channel using a trusted configuration space. FIGS. 4-11, which are discussed below, show an example (involving the PCIe™ bus) of how communication of information via an in-band channel using a trusted configuration space can be implemented.

Example Mechanism for Communication Via an In-Band Channel Using a Trusted Configuration Space with PCI Express® Bus PCI Express® (or PCIe™) is an Input/Output (I/O) interconnect bus standard (which includes a protocol and a layered architecture) that expands on and doubles the data transfer rates of original PCI. PCI Express® is a two-way, serial connection that carries data in packets along two pairs of point-to-point data lanes, compared to the single parallel data bus of traditional PCI that routes data at a set rate. Initial bit rates for PCI Express® reach 2.5 Gb/s per lane direction, which equate to data transfer rates of approximately 200 MB/s. PCI Express® was developed so that high-speed interconnects such as 1394b, USB 2.0, InfiniBand and Gigabit Ethernet would have an I/O architecture suitable for their transfer high speeds. PCI Express®, also known as 3GIO (for third-generation Input/Output) is compatible with existing PCI systems.

PCI Express® builds on PCI, making it possible to transfer data faster and more efficiently. PCI Express® is a serial interconnect standard allowing for low pin-count devices and fewer board traces. The PCI Express® standard is a dual simplex link, meaning data can be transferred in both directions at the same time with lane widths of x1, x2, x4, x8, x12, x16, and x32.

The development of PCI Express® was driven by the need to move more data faster than ever before. PCI-based systems are reaching their functional limit due to factors such as signal integrity and practicality. Shared buses like PCI can only tolerate so many devices per bus before signal integrity begins to degrade. For a typical 64-bit/66 MHz PCI bus, the number of devices is limited to about five per bus segment. To increase the number of devices, bridges must be added to another bus segment. Adding bridges adds latency to the system and degrades performance. Also, to increase bandwidth in a shared parallel bus system, the clock speed or amount of signals must be increased to scale up the bandwidth. A 64-bit PCI or PCI-X card already has about 90 signals to contend with, so it is becoming impractical to increase bandwidth by adding more signals.

To solve these issues, PCI Express® is a point-to-point, switch fabric-based protocol. Data is sent as a serial bit stream at rates of 2.5 Gb/s on each lane. Various lane widths are supported, and each lane consists of a pair of differential signals in each direction. A x1 link consists of one signal pair in both the transmit and receive direction making a total of 4 signals. Similarly, a x32 link consists of 32 signal pairs in both the transmit and receive directions making a total of 128 signals. The transmit and receive widths on a given link must be symmetrical, but devices of different lane sizes can communicate with each other. During link training, the lane width of each device is negotiated, and the link between the two devices will match the lane width of the smaller device. Because PCI Express® is a point-to-point interconnect, switches are used to connect multiple devices in a system. Switches are intermediate devices in the system allowing communication from the root complex to the various end points and vice versa.

PCI Express® uses packets to move information through the system which allows for in-band communication between applications and devices. Data is encapsulated into packets and sent as a serial stream on the link. The packets contain information such as the destination address, amount of data being sent or being read, cyclic redundancy checking (CRC), and the command. PCI Express® commands are based largely on familiar commands from PCI. PCI Express® uses a split transaction protocol. This means for non-posted transactions the receiving device will return a completion allowing the transmitting device to recognize the transaction was completed successfully. Commands available in PCI Express® are based on the different address spaces supported. PCI Express® supports the same address spaces found in PCI, which are configuration, IO, and memory, along with the addition of message address space.

Figure 4:
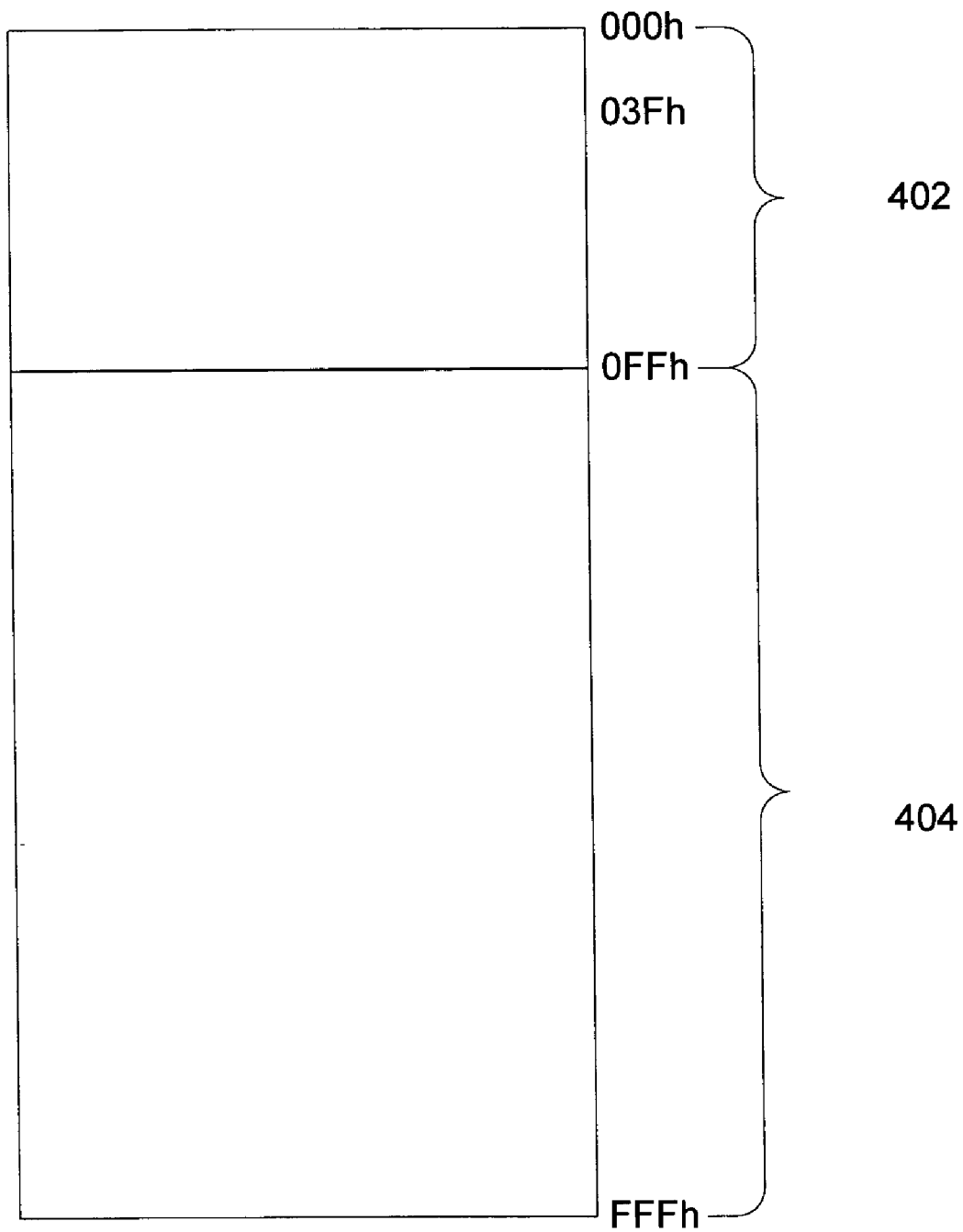
FIG. 4 is a diagram illustrating as an example of a bus configuration space including the Peripheral Component Interconnect (PCI) bus configuration space and the PCI Express® (PCIe™) bus extended configuration space.

Referring next to FIG. 4, shown is a diagram illustrating as an example the PCI bus configuration address space and the PCI Express® bus extended configuration address space. PCI Express® makes use of the same configuration space model as PCI. The PCI configuration space 402 consists of 256 bytes. Because PCI Express® uses this same defined space, it ensures that legacy operating systems (OSs) and device drivers can run on a PCI Express® system. For new OSs and device drivers, PCI Express® extends the 256-byte configuration space to 4 KB 404. New OSs and device drivers can make use of this extended space to add more flexibility to the system.

Figure 5:
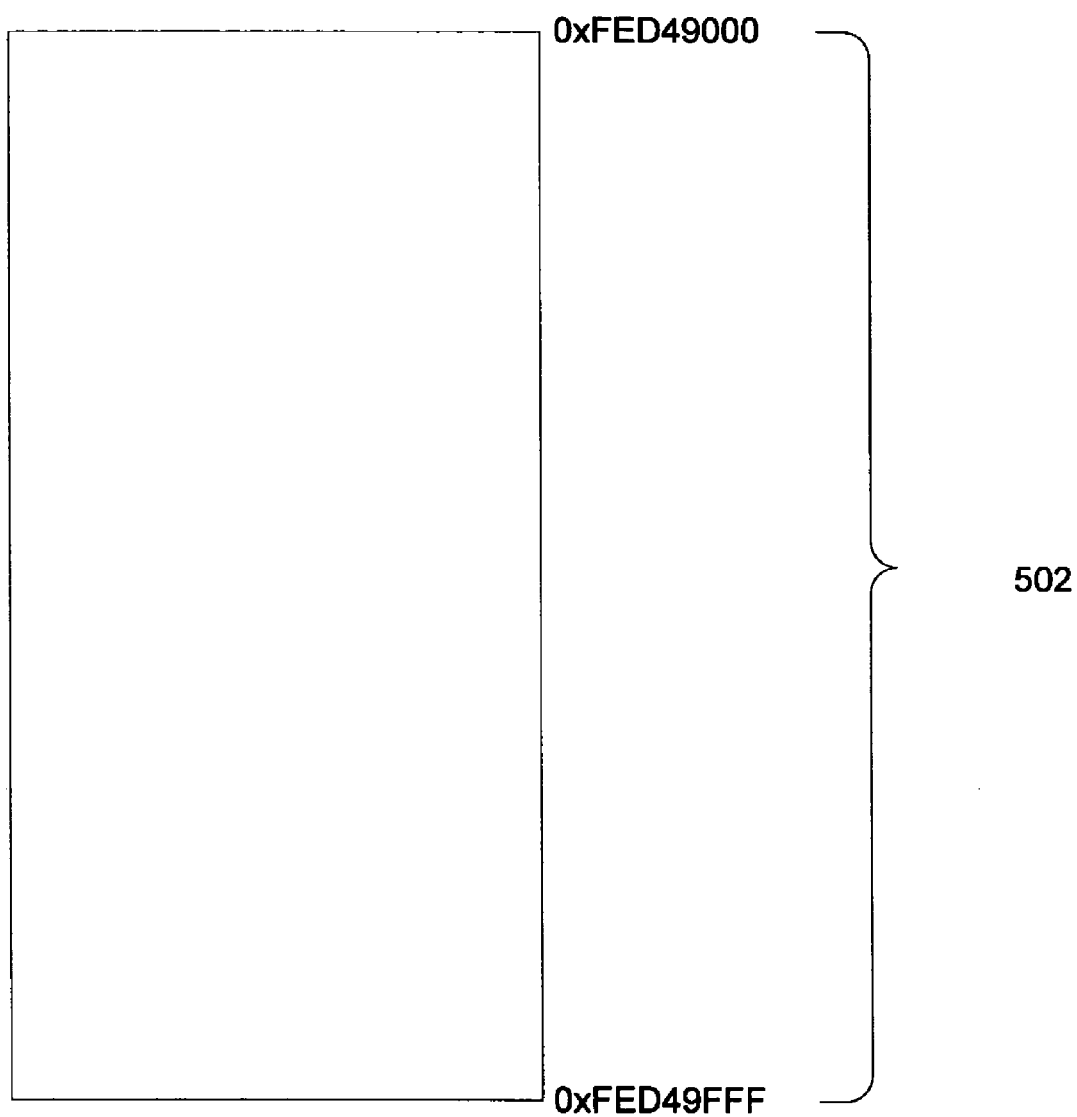
FIG. 5 is a diagram illustrating a trusted configuration space implemented with the PCIe™ bus as an example.

Referring next to FIG. 5, communication via an in-band channel between trusted applications and devices posits and describes the creation and addition of a new, optional, closely protected address space 502 called "Trusted Configuration Space" (TCS) 502. Unlike conventional/standard PC configuration space, such as standard PCI Express® configuration space shown in FIG. 4, TCS address space 502 only allows trusted software under special conditions to identify, configure and communicate with trusted system hardware devices. It is important to note that the term "trusted" is not used herein necessarily in the literal sense, but means that a certain set of attributes or security features and/or level of security has been agreed to by both the sending and receiving side of the information that is being communicated. How TCS 502 is used to accomplish allowing such communication is described below by using an implementation with PCI Express® as one example.

Figure 6:
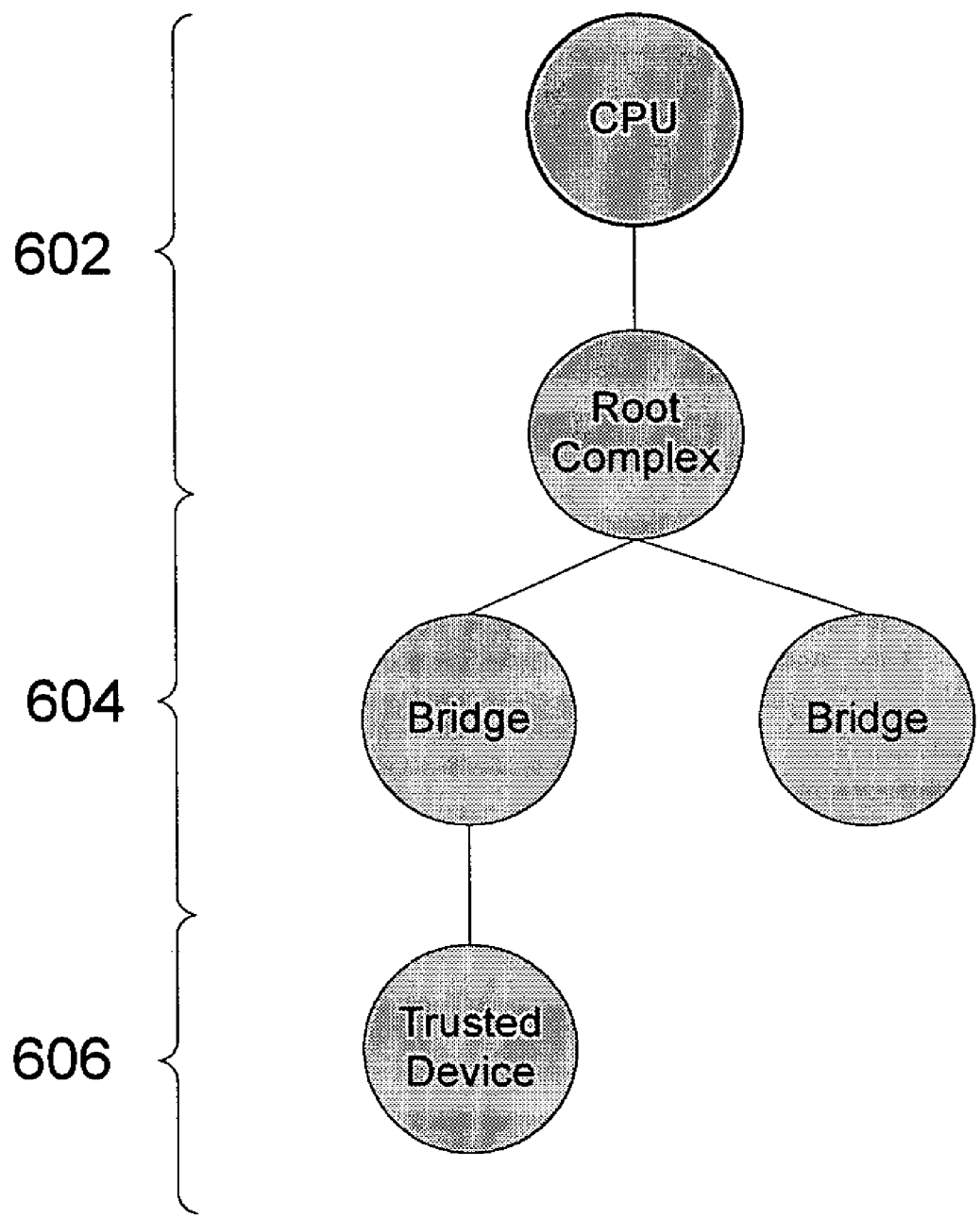
FIG. 6 is a tree diagram illustrating a high-level view of an architecture of a system in which communication of information via an in-band channel using a trusted configuration space may be implemented.

Referring next to FIG. 6, shown is a tree diagram illustrating a high-level view of an architecture of a system in which communication of information via an in-band channel using a trusted configuration space may be implemented. FIG. 6 depicts the trusted CPU-root complex interface 602 which is in communication with bridges 604 over which trusted in-band messages can be delivered, and the trusted device interface 606 that may receive or send the trusted in-band messages.

Figure 7:
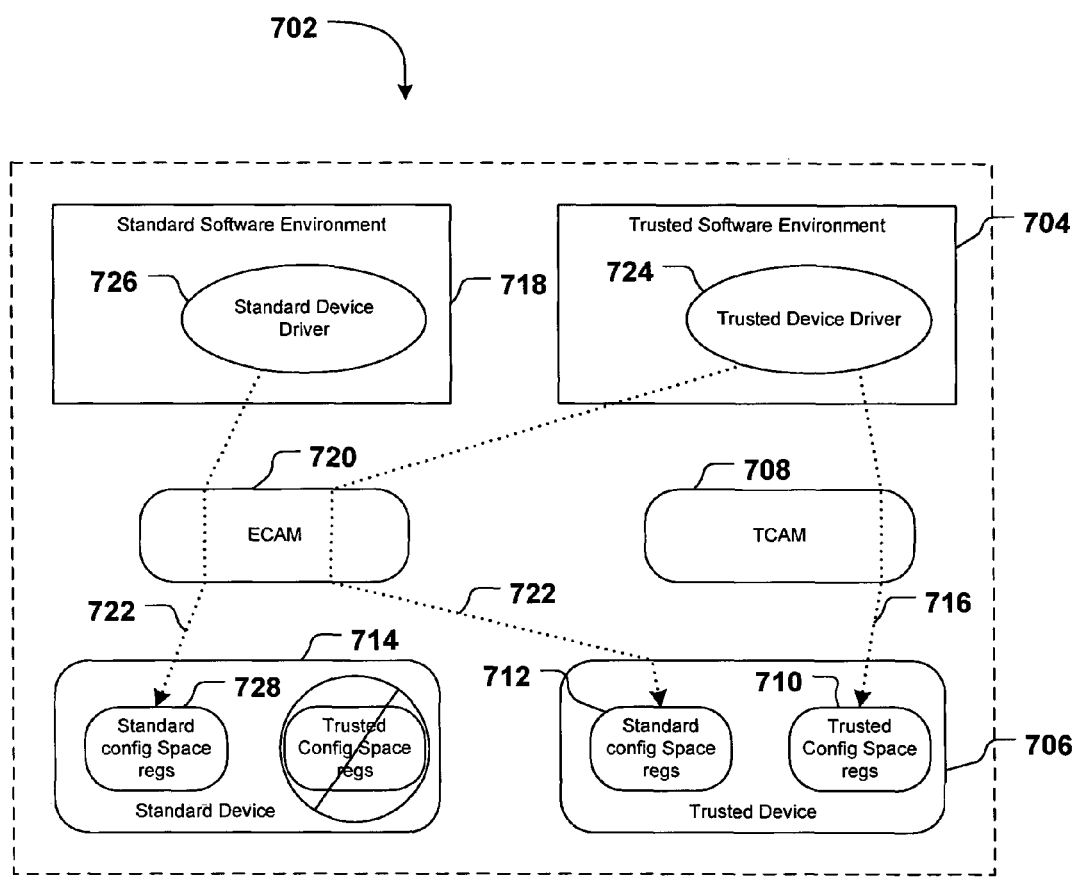
FIG. 7 is a block diagram illustrating the architecture of a system embodying the basic flow of FIG. 6, showing how communication of information via an in-band channel using a trusted configuration space may be implemented using standard and trusted software environments.

Referring next additionally to FIG. 7, shown is a block diagram illustrating the architecture of a system embodying the basic flow of FIG. 6. FIG. 6 shows how communication of information via an in-band channel using a trusted configuration space (TCS) may be implemented using standard 718 and trusted 704 software environments.

The system 702 uses TCS 502 to communicate from a Trusted Software Environment (TSE) 704 running on the system to PCI Express® trusted devices 706, for example. In the PCI Express® example provided herein, TCS 502 is an additional PCI Express® address space that allows software running in a TSE 704 to configure and communicate with PCI Express® trusted devices 706 by issuing trusted configuration requests 716. These requests use read and write transaction layer packet (TLP) types that only originate from a TSE 704. Access to TCS 502 within a trusted software environment 704 is provided via a Trusted Configuration Access Mechanism (TCAM) 708. The introduction of TCS 502 enables the design of trusted computing platforms capable of providing compliant devices 706 with assurance that their trusted configuration registers can only be accessed by software 724 running in the TSE 704. Establishing device trust in the software 724 that initiates trusted configuration requests 716 makes it possible to secure and control access to certain secret, sensitive, or personally-identifiable information these devices 706 may contain (e.g., a uniquely-identifying public key, as described above, or certificate which the device provides for revocation purposes). While a full description of a TSE 704 is platform-specific, the following requirements are provided as an example to apply to a system implementing a TSE 704 capable of issuing trusted configuration transactions 716:

1. The platform is able to restrict which software is allowed to access the Trusted Configuration Access Mechanism (TCAM) 708. The level of effort involved in enforcing this restriction is dependent upon how "field configurable" the software environment is:
    a. For some embedded system applications, it may be sufficient to simply lock down the software configuration such that no unauthorized software can be added to or run on that system.
    b. In more "flexible" environments (e.g., a PC running a general-purpose OS) hardware support at the processor and supporting chipset level is required in order to identify and distinguish between software running within a TSE 704 and software 726 running outside of a TSE 704, and to only allow TCAM 708 access by software 724 running inside of a TSE 704.
2. For the more flexible environments (e.g., 1.b above), an owner-accessible mechanism is provided to allow for assignment of one or both of the following capabilities to a given piece of software:
    a. To run in the TSE 704
    b. To access the TCAM 708 when running in the TSE 704
   This explicit "opt-in" model provides assurance to the trusted device 706 that any trusted configuration request 716 it receives originated from software 724 authorized by the machine owner to make that request.
3. If a platform allows software 726 outside of the TSE 704 to run concurrently with software 724 inside the TSE 704, then the platform provides a mechanism for software 724 running in the TSE 704 to monitor and/or control configuration changes (e.g., bus number assignment) that occur during the time TCAM 708 is being used.
4. The platform prevents software 726 running outside of the TSE 704 (including firmware) from virtualizing or emulating devices accessed via the TCAM 708.
5. If a platform supports add-in cards, the platform ensures that those devices cannot perform DMA to the TCAM 708 Region.

Referring again to FIG. 5, the TCS 502 is, for example, 4 KB in size and consists of a fixed size header (starting at offset 000 h) and is followed by a linked list of variable sized capabilities. The header contains the offset of the first trusted capability. Trusted configuration requests are routed 716 by ID (bus number, device number, function number). While TCS address space 502 is independent of standard configuration address space, a trusted device 706 may have certain registers 710 712 that map into both address spaces, while a standard device 714 has registers 728 that only map into standard configuration space. Switches, such as PCI Express® switches, for example, that support routing of trusted configuration requests 716 (also referred to as "TCS routing") route these trusted configuration requests 716 downstream and do not propagate upstream any trusted configuration requests 716 arriving at one of their downstream ports. This is the same behavior as for configuration requests.

The root complex 602 (shown in FIG. 6) initiates trusted configuration requests 716 and only in response to a request from a trusted software environment 704. In the present example, no other PCI Express® entity is permitted to initiate a trusted configuration request 716.

Support of TCS 502 may be optional for devices, such as the standard device shown in FIG. 7, and support for routing of trusted configuration requests 716 may be optional for root ports and switches. An upstream trusted configuration request received at a downstream port may be considered a malformed transaction layer packet (TLP) and handled accordingly. Also, a downstream trusted configuration request received at the upstream port of a switch that does not support TCS routing may also be considered a malformed TLP. Trusted configuration requests 716 are not transmitted to any device that does not indicate support for trusted configuration space 502 or through any switch port that does not indicate support for TCS routing. Trusted configuration requests 716 are not transmitted through a root port that indicates a lack of support for TCS routing.

Switches do not modify trusted configuration requests 716, nor do they convert other types of requests to trusted configuration requests 716. This also applies to debug modes of the switch. Root complexes 602 implement trusted configuration space only on platforms that provide a Trusted Software Environment 704.

Host bridges 604 (shown in FIG. 6) support the TCAM 708 by translating memory-mapped host processor accesses into trusted configuration transactions 716. The TCAM 708 provides a flat memory-mapped address range to generate trusted configuration requests 716. The TCAM 708 closely parallels the Enhanced Configuration Access Mechanism (ECAM) 720 that handles standard configuration space requests 722, only the TCAM uses a different base address and is usable only by software running within a TSE 704. For systems that provide a processor-architecture-specific firmware interface for accessing standard configuration space instead of providing an ECAM 720, a firmware interface would be provided for accessing TCS 502 instead of providing a TCAM 708. In such implementations, the firmware supports execution from within the TSE 704. Also, if a platform allows software outside of the TSE 704 to run concurrently with software inside the TSE 704, then the platform must provide a mechanism for software running in the TSE 704 to monitor and/or control configuration changes (e.g., bus number assignment) that occur during the time TCAM 708 is being used.

A system that exposes a TCAM 708 to an operating system has the following exemplary characteristics:

1. The size of the memory address range for the TCAM is the same as the memory address range for the corresponding ECAM 704.
2. The mapping from memory address space to TCS 502 address (bus number, device number, function number, etc.) parallels the mappings for an ECAM 720.
3. The size and base address of the TCAM 708 are reported by the firmware to the operating system in an implementation-specific manner.
4. A TCAM 708 is not required to support accesses larger than a DW, or accesses that cross a DW boundary.
5. A TCAM 708 is not required to support a locked access.
6. System hardware provides a method for system software to guarantee that a write transaction using the TCAM 708 is completed by the completer before system software execution continues.

7. Device drivers preferably use the application programming interface (API) provided by the operating system to access the configuration space of its device and not directly use the hardware mechanism.

Also, because root complex 602 implementations are not required to support the generation of trusted configuration requests 716 from memory space accesses that cross DW boundaries, or that use locked semantics, the generation of such requests are not caused when using the TCAM 708 unless it is known that the root complex 602 implementation being used supports the translation.

Figures 8, 9:
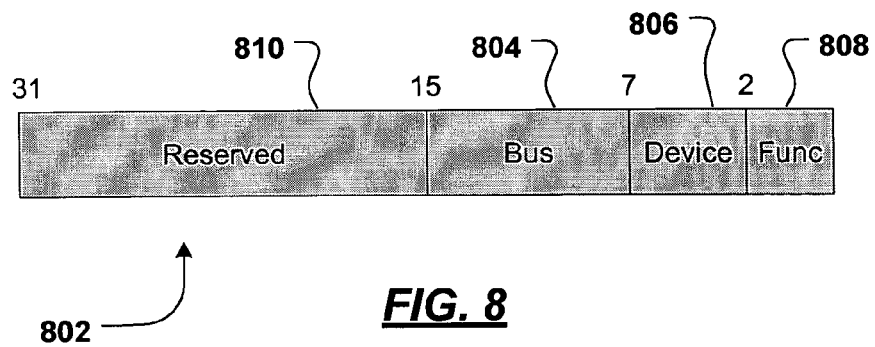
FIG. 8 is a diagram of a trusted configuration space index register used in communication of information via an in-band channel using a trusted configuration space.
FIG. 9 is a chart illustrating as an example transaction layer packet (TLP) types used in an alternative implementation of communication of information via an in-band channel using a trusted configuration space with the PCI Express® bus.

Referring next to FIG. 8, shown is a diagram of a trusted configuration space index register 802 utilized in communication of information via an in-band channel using a TCS 502. A 32 bit TCS index register 802 created, for example, at 0xFED48000, selects which device's configuration space is targeted by accesses to the 4Kb TCS 502 data page. Read and writes to this page are then translated into trusted configuration accesses addressed to the device selected by the 32 bit TCS index register 802. This index register 802 selects a single device's configuration space using its trusted bus number 804, device number 806 and function number 808 in the PCI Express® example as described below:

1. Bus Number 804—PCI Express® maps logical PCI Bus Numbers onto PCI Express® links such that PCI 3.0 compatible configuration software views the configuration space of a PCI Express® hierarchy as a PCI hierarchy including multiple bus segments.
2. Device Number 806—Device number association is that which parallels the device number association used with standard configuration space in PCI Express®.
3. Function Number 808—PCI Express® also supports multi-function devices using the same discovery mechanism as PCI 3.0. PCI Express® trusted devices (including single function devices) decode the function number.
4. 16 reserved bits 810 are available to describe multiple segments when necessary.

Transaction layer packet (TLP) types used in implementing communication of information via an in-band channel using a trusted configuration space with the PCI Express® bus consist of two new added trusted configuration packets, TCfgRd and TCfgWr (shown below).

| TLP Type | FMT [1:0] | Type [4:0] | Description |
|---|---|---|---|
| TCfgRd | 00 | 11011 | Trusted Configuration Read |
| TCfgWr | 10 | 11011 | Trusted Configuration Write |

Alternatively, referring next to FIG. 9, shown is a chart illustrating as an example transaction layer packet (TLP) types used in an alternative implementation of communication of information via an in-band channel using a trusted configuration space with the PCI Express® bus. The new TLP types are trusted configuration TLPs 902 analogous to standard PC configuration space TLPs 904 with type 0/1 read and writes 906 together with trusted completions. The communication of information via an in-band channel using a trusted configuration space with the PCI Express® bus is cognizant of the hierarchical nature of the bus. Trusted bus numbers are used to route trusted configuration TLPs 902. Trusted configuration packets 902 implement RequestorID in terms of the trusted bus number.

The TCS headers follow the same header format as traditional type 0 and 1 headers. Many registers are now entirely reserved (e.g., command and status registers not used). This allows for the future definition of trusted memory and I/O spaces. For Type 1 (Bridge) headers, bus number registers are used by trusted software to program trusted bus numbers. Root Ports that route TCS requests set a "TCS Routing Supported" bit in their PCI Express® capabilities register for both upstream and downstream ports.

Figure 10:
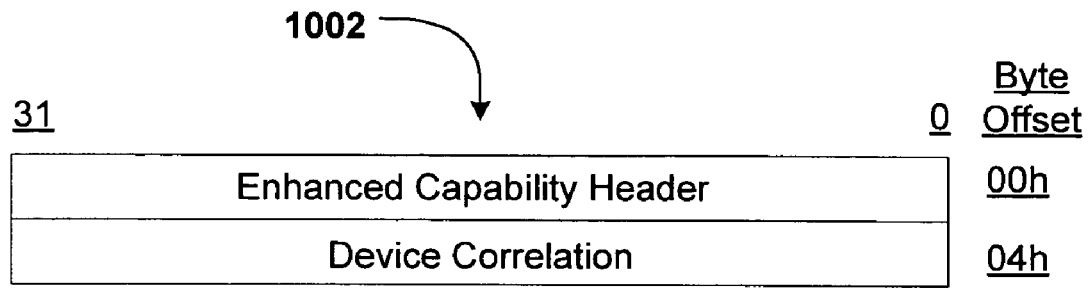
FIG. 10 is a diagram detailing as an example the allocation of register fields in a configuration access correlation (CAC) capability structure.
Figure 11:
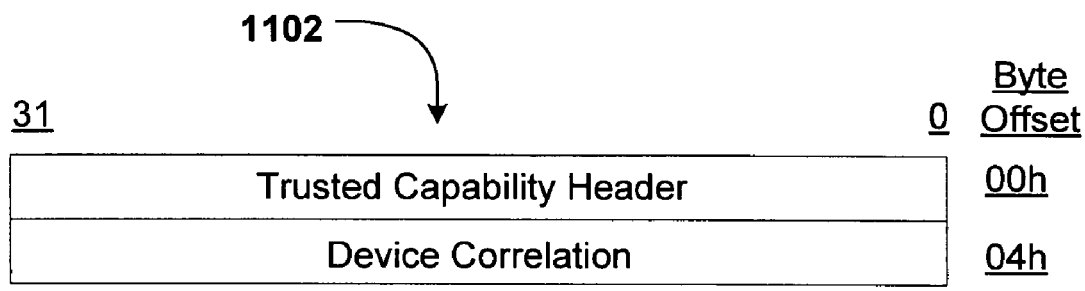
FIG. 11 is a diagram detailing as an example the allocation of register fields in a configuration access correlation (CAC) trusted capability structure.

Referring again to FIG. 5 and FIG. 7, Configuration Access Correlation (CAC) capability is an extended capability that is implemented by a device 706 that provides a TCS 502. The CAC is used to validate accesses made to the device via the TCAM 708. Contained within the CAC is a read-only 32-bit value that is used by software running within the TSE 704 to validate that standard configuration space accesses 722 performed via ECAM 720 are targeting the same device 706 as TCS accesses 716 performed via the corresponding TCAM 708. Referring next to FIG. 10 and FIG. 11, shown are diagrams detailing as an example the allocation of register fields in a CAC capability structure 1002 and CAC trusted capability structure 1102, respectively. Devices that implement the CAC capability 1002 also implement the corresponding CAC trusted capability 1102 in TCS 502. Both capabilities access the same register for the device correlation. It is by this means that correlation is verified by software running in the TSE 704.

The exemplary implementation using PCI Express® described above is merely one example of how communication of information via an in-band channel using a TCS may be accomplished. The example provided above highlights the ability to remain closely similar to a current standard (i.e., traditional, PC configuration space) implementations which are more familiar to implementing practitioners. Other implementations and embodiments are possible. Furthermore, it is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method, implemented by at least one machine, of communicating between a first component and a second component, the first component and second component being communicatively connected to each other through a bus having protected and non-protected bus configuration address spaces and being accessible to components other than the first component and the second component, the method comprising:

establishing a communication connection between the first component and the second component, wherein the communication connection transmits information through the bus;

transmitting a datum between the first component and the second component using the protected bus configuration address space allowing the first component only under special conditions to communicate with the second component, wherein the protected bus configuration address space is mapped independently of the non-protected bus configuration address space, wherein non-existence of special conditions permits communication using the non-protected bus configuration address space and wherein existence of the special conditions permits communication using the non-protected and protected bus configuration address spaces, wherein the protected bus configuration address space is protected via an access restriction mechanism that only allows access to the protected bus configuration address space from the first component and second component if the first and second components are identified as trusted components;

transmitting a datum between the first component and the second component using the non-protected bus configuration address space;

mapping communication requests into both the protected bus configuration address space and the non-protected bus configuration address space using registers of the second component if the second component is one that is identified as a trusted component; and mapping communication requests into only the non-protected bus configuration address space using registers of the second component if the second component is not identified as a trusted component.

2. The method of claim 1 wherein the protected bus configuration address space is protected via an access restriction mechanism that only allows access to the protected bus configuration address space through read or write requests from the first component and second component.

3. The method of claim 1 wherein the transmitting a datum between the first component and the second component using a protected bus configuration address space comprises:

communication via protected bus configuration address space transaction layer packets that are differentiable from transaction layer packets of the non-protected bus configuration address space.

4. The method of claim 3 wherein the transmitting a datum between the first component and the second component using a protected bus configuration address space further comprises:

providing via the access restriction mechanism a flat memory-mapped address range to generate communication requests between the first and second components if the first and second components are identified as trusted components; and using a different base address by the access restriction mechanism than an access mechanism of the non-protected bus configuration address space, said memory mapped address range usable only by the first and second components if they are identified as trusted components.

5. The method of claim 4 wherein the first component is a component associated with a software application and the second component is a component associated with a device communicatively connected to the bus.

6. The method of claim 3 further comprising:

identifying whether the device is a trusted device by utilizing a configuration access correlation capability of the device containing a value that enables the software application to validate that accesses to the non-protected bus configuration address space are targeting the same device as corresponding accesses to the non-protected bus configuration address space.

7. A computer readable storage medium having instructions stored thereon for performing the method of claim 1.

8. The computer readable storage medium of claim 7 having instructions stored thereon for performing the method of claim 2.

9. The computer readable storage medium of claim 8 having instructions stored thereon for performing the method of claim 3.

10. The computer readable storage medium of claim 8 having instructions stored thereon for performing the method of claim 4.

11. The computer readable storage medium of claim 8 having instructions stored thereon for performing the method of claim 5.

12. The computer readable storage medium of claim 8 having instructions stored thereon for performing the method of claim 6.

13. A system, comprising at least one machine, for communicating between a first component and a second component, the first component and second component being communicatively connected to each other through a bus having protected and non-protected bus configuration address spaces and being accessible to components other than the first component and the second component, the at least one machine of the system comprising:

means for establishing a communication connection between the first component and the second component, wherein the communication connection transmits information through the bus;

means for transmitting a datum between the first component and the second component using the protected bus configuration address space allowing the first component only under special conditions to communicate with the second component, wherein the protected bus configuration address space is mapped independently of the non-protected bus configuration address space, wherein non-existence of special conditions permits communication using the non-protected bus configuration address space and wherein existence of the special conditions permits communication using the non-protected and protected bus configuration address spaces, wherein the protected bus configuration address space is protected via an access restriction mechanism that only allows access to the protected bus configuration address space through read or write requests from the first component and second component if the first and second components are identified as trusted components;

means for transmitting a datum between the first component and the second component using the non-protected bus configuration address space wherein the protected bus configuration address space is independent of the non-protected bus configuration address space;

means for mapping communication requests into both the protected bus configuration address space and the non-protected bus configuration address space using registers of the second component if the second component is one that is identified as a trusted component; and means for mapping communication requests into only the non-protected bus configuration address space using registers of the second component if the second component is not identified as a trusted component.

14. The system of claim 13 wherein the protected bus configuration address space is protected via an access restriction mechanism that only allows access to the protected bus configuration address space through read or write requests from the first component and second component.

15. The system of claim 13 wherein the means for transmitting a datum between the first component and the second component using a protected bus configuration address space comprises:
  means for communication via protected bus configuration address space transaction layer packets that are differentiable from transaction layer packets of the non-protected bus configuration address space.

16. The system of claim 15 wherein the means for transmitting a datum between the first component and the second component using a protected bus configuration address space further comprises:
  means for providing via the access restriction mechanism a flat memory-mapped address range to generate communication requests between the first and second components if the first and second components are identified as trusted components; and
  means for using a different base address by the access restriction mechanism than an access mechanism of the non-protected bus configuration address space, said memory mapped address range usable only by the first and second components if they are identified as trusted components.

17. A computer bus system comprising:
  a protected bus configuration address space, wherein using the protected bus configuration address space allows a first component only under special conditions to communicate with a second component; and
  a non-protected bus configuration address space, wherein the protected bus configuration address space is mapped independently of the non-protected bus configuration address space, access to the non-protected bus configuration address space is not subject to the same special conditions required to use the protected address space such that non-existence of special conditions permits communication using the non-protected bus configuration address space, and existence of the special conditions permits communication using the non-protected and protected bus configuration address spaces, wherein:
  the protected bus configuration address space is protected via an access restriction mechanism that only allows access to the protected bus configuration address space through read or write requests from the first component and second component if the first and second components are identified as trusted components;
  a datum is transmitted between the first component and the second component using the non-protected bus configuration address space;
  communication requests are mapped into both the protected bus configuration address space and the non-protected bus configuration address space using registers of the second component if the second component is one that is identified as a trusted component; and
  communication requests are mapped into only the non-protected bus configuration address space using registers of the second component if the second component is not identified as a trusted component.

* * * * *

UNITED STATES PATENT AND TRADEMARK OFFICE
CERTIFICATE OF CORRECTION

| | | |
|---|---|---|
| PATENT NO. | : 7,779,275 B2 | Page 1 of 1 |
| APPLICATION NO. | : 11/285882 | |
| DATED | : August 17, 2010 | |
| INVENTOR(S) | : Thornton et al. | |

It is certified that error appears in the above-identified patent and that said Letters Patent is hereby corrected as shown below:

In column 14, line 4, in Claim 9, delete "claim 8" and insert -- claim 7 --, therefor.

In column 14, line 7, in Claim 10, delete "claim 8" and insert -- claim 7 --, therefor.

In column 14, line 11, in Claim 11, delete "claim 8" and insert -- claim 7 --, therefor.

In column 14, line 14, in Claim 12, delete "claim 8" and insert -- claim 7 --, therefor.

Signed and Sealed this
Tenth Day of May, 2011

David J. Kappos
*Director of the United States Patent and Trademark Office*